US010001722B2

(12) United States Patent
Miyazawa

(10) Patent No.: US 10,001,722 B2
(45) Date of Patent: Jun. 19, 2018

(54) NON-TRANSITORY COMPUTER-READABLE RECORDING MEDIUM FOR CONTROL DEVICE AND CONTROL DEVICE

(71) Applicant: BROTHER KOGYO KABUSHIKI KAISHA, Nagoya, Aichi (JP)

(72) Inventor: Masafumi Miyazawa, Nagoya (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 0 days. days.

(21) Appl. No.: 15/336,903

(22) Filed: Oct. 28, 2016

(65) Prior Publication Data

US 2017/0371271 A1 Dec. 28, 2017

(30) Foreign Application Priority Data

Jun. 24, 2016 (JP) ................................ 2016-125810

(51) Int. Cl.

*G06K 15/02* (2006.01)
*G03G 15/08* (2006.01)
*G06F 3/12* (2006.01)

(52) U.S. Cl.

CPC ................................ *G03G 15/0831* (2013.01)

(58) Field of Classification Search

None

See application file for complete search history.

(56) References Cited

U.S. PATENT DOCUMENTS

| | | | | | |
|---|---|---|---|---|---|
| 6,463,224 | B1 * | 10/2002 | Phillips | G03G 15/0849 | 399/27 |
| 7,766,438 | B2 * | 8/2010 | Ehlert | B41J 2/17546 | 347/6 |
| 2002/0161535 | A1 * | 10/2002 | Kawakita | G06F 17/509 | 702/42 |
| 2003/0071726 | A1 * | 4/2003 | Hopper | G06K 15/00 | 340/540 |
| 2011/0069977 | A1 * | 3/2011 | Yasukawa | G03G 15/556 | 399/27 |
| 2012/0148267 | A1 * | 6/2012 | Kawai | G03G 15/5079 | 399/8 |

(Continued)

FOREIGN PATENT DOCUMENTS

| | | | | |
|---|---|---|---|---|
| JP | 2003-015477 * | 1/2003 | G03G 21/00 |
| JP | 2003-015477 A | 1/2003 | |

*Primary Examiner* — Beniyam Menberu

(74) *Attorney, Agent, or Firm* — Scully, Scott, Murphy & Presser, PC

(57) ABSTRACT

A control device may obtain, at each of a plurality of sets of date-and-time, a current value related to a current remaining amount of a print material used by the print performing unit. The control device may calculate N1 change values by using a plurality of current values obtained at the plurality of sets of date-and-time, each change value being related to a change per unit time of a remaining amount of the print material. The control device may specify a first greatest change value among the N1 change values. The control device may perform a first prediction process that includes calculating a first future value by using the first greatest change value, the first future value being related to a future remaining amount of the print material, and a first output process using the first future value in a case where the first prediction process is performed.

13 Claims, 7 Drawing Sheets

(56) References Cited

U.S. PATENT DOCUMENTS

| | | | | |
|---|---|---|---|---|
| 2013/0148160 | A1* | 6/2013 | Morimoto | G06F 3/1296<br>358/1.15 |
| 2016/0097991 | A1* | 4/2016 | Oshima | G03G 15/556<br>399/27 |
| 2016/0292772 | A1* | 10/2016 | Nagasaki | G06Q 30/0633 |

* cited by examiner (First to Third Embodiments)

(Second Embodiment)

(Third Embodiment)

(Fourth Embodiment)

NON-TRANSITORY COMPUTER-READABLE RECORDING MEDIUM FOR CONTROL DEVICE AND CONTROL DEVICE

CROSS-REFERENCE TO RELATED APPLICATIONS

This application claims priority to Japanese Patent Application No. 2016-125810, filed on Jun. 24, 2016, the contents of which are hereby incorporated by reference into the present application.

TECHNICAL FIELD

The present teachings disclose a technique relating to a control device for executing a process related to a print performing unit.

DESCRIPTION OF RELATED ART

A technique is known for estimating a date that a printer becomes incapable of printing. Specifically, the printer measures a remaining amount of developer every three days, and stores the remaining amount and a number of use days of the developer. The printer uses the stored plurality of remaining amounts to calculate a straight line for predicting a future remaining amount of developer, and specifies a date on the straight line corresponding to a remaining amount of being incapable of printing. In particular, two types of straight line for predicting the date of being incapable of printing are disclosed. The first type of straight line is a straight line passing through two points among a plurality of remaining amounts, a point indicating a remaining amount at a day of beginning to use the developer, and a point indicating a latest remaining amount. The second type of straight line is an approximate straight line of all points indicating the plurality of remaining amounts.

SUMMARY

There may be a period where many printed sheets are printed, and a period where few are printed. That is, a usage amount of the developer per unit time changes. For example, even if there is a considerable remaining amount, the developer will finish early if there is a large usage amount of developer per unit time. In the technique described above, the date of being incapable of printing is predicted without considering a change in the usage amount of the developer per unit time. As a result, if a period occurs in the future in which there is a large usage amount of the developer per unit time, the remaining amount may become an amount incapable of printing earlier than the predicted date.

The present teachings provide a technique for appropriately calculating a future value related to a future remaining amount of print material.

A non-transitory computer-readable recording medium storing computer-readable instructions for a control device configured to perform a process related to a print performing unit, the computer-readable instructions, when executed by a processor of the control device, causing the control device to execute: obtaining, at each of a plurality of sets of date-and-time, a current value related to a current remaining amount of a print material used by the print performing unit; calculating N1 (N1 being an integer equal to or greater than 2) change values by using a plurality of current values obtained at the plurality of sets of date-and-time, each change value being related to a change per unit time in a remaining amount of the print material; specifying a first greatest change value indicating that the change per unit time is the greatest among the N1 change values; and a first prediction process that includes calculating a first future value by using the first greatest change value, the first future value being related to a future remaining amount of the print material.

The present application may further discloses a non-transitory computer-readable recording medium storing computer-readable instructions for a control device configured to perform a process related to a print performing unit, the computer-readable instructions, when executed by a processor of the control device, causing the control device to execute: obtaining, at each of a plurality of sets of date-and-time, a current value related to a current remaining amount of a print material used by the print performing unit; a first prediction process that includes calculating a first future value by using a plurality of current values obtained at the plurality of sets of date-and-time, in a case where a latest current value obtained at the latest date-and-time among the plurality of current values indicates that a remaining amount of the print material is equal to or less than a reference value, the first future value being related to a future remaining amount of the print material; a first output process for outputting information at least based on the first future value in a case where the latest current value indicates that the remaining amount of the print material is equal to or less than the reference value and the first prediction process is executed, wherein the first output process is not executed in a case where the latest current value indicates that the remaining amount of the print material is more than the reference value.

The control device, and a control method of the control device, are novel and useful.

EMBODIMENT (First Embodiment)

Figure 1:
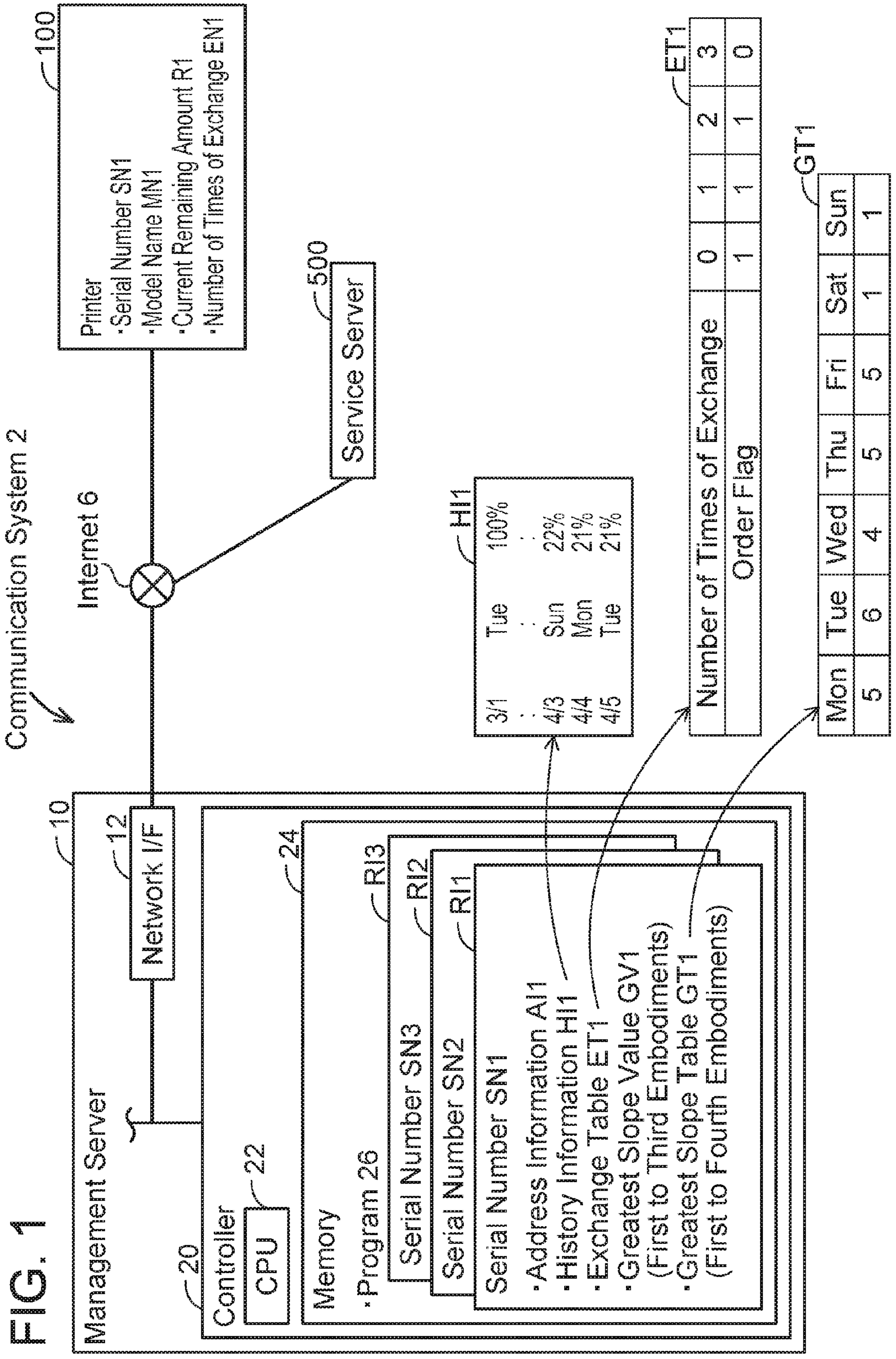
FIG. 1 shows a configuration of a communication system.

(Configuration of Communication System: FIG. 1)

As shown in FIG. 1, a communication system 2 comprises a management server 10, a printer 100 and a service server 500. The devices 10, 100, 500 are capable of communicating with each other via internet 6.

(Configuration of Printer 100)

The printer 100 is a device capable of executing at least a printing function. The printer 100 executes printing by using a print material (e.g., toner, ink, etc.) housed in a cartridge (not shown) that is detachably installed to a main body of the printer 100. A serial number SN1 is assigned to the printer 100. The serial number SN1 is a unique character string assigned by a vendor of the printer 100 when a plurality of printers is manufactured having a model name the same as a model name MN1 of the printer 100.

Further, the printer 100 stores, in a memory (not shown), a current remaining amount R1 which indicates a current remaining amount of print material housed in the cartridge installed in the printer 100, and a number of times of exchange EN1 of the cartridge. When a new cartridge is installed, the printer 100 updates the current remaining amount R1 in the memory to 100%. Then, the printer 100 updates the current remaining amount R1 each time printing is executed. Specifically, in a case where image data representing an image to be printed is obtained, the printer 100 uses the obtained image data to estimate a usage amount of the print material required to print the image. Then, when the print of the image is executed, the printer 100 subtracts the estimated usage amount from the current remaining amount R1, updating the current remaining amount R1. Moreover, in a modification, the printer 100 may comprise a sensor for measuring the remaining amount of print material in the cartridge, and may update the current remaining amount R1 each time the sensor measures the remaining amount of print material.

Further, the printer 100 updates the number of times of exchange EN1 in the memory each time the cartridge is exchanged. Specifically, when a cartridge is first installed after the printer 100 has been shipped, the printer 100 stores the number of times of exchange EN1 indicating "0", then increments the number of times of exchange EN1 each time the cartridge is exchanged.

(Configuration of Management Server 10)

The management server 10 is a server for managing a plurality of printers including the printer 100. The management server 10 is located on the internet 6 by the vendor of the printer 100.

The management server 10 comprises a network interface 12 and a controller 20. The units 12, 20 are connected to a bus line (not numbered). Moreover, below, interface will be referred to as "I/F". The controller 20 comprises a CPU 22 and a memory 24. The CPU 22 executes various processes in accordance with a program 26 stored in the memory 24. The memory 24 may be configured by a volatile memory, a non-volatile memory, etc.

In addition to the program 26, the memory 24 stores a plurality of registration information RI1 to RI3. Upon obtaining a registration instruction including the serial number SN1 of the printer 100 from the printer 100, the CPU 22 registers the serial number SN1 in the memory 24. Then, the CPU 22 stores the registration information RI1 in association with the serial number SN1 in the memory 24. The registration information RI1 includes address information AI1 showing an address of a user of the printer 100, history information HI1 showing a history of the remaining amount of print material, an exchange table ET1, and a greatest slope value GV1. Moreover, upon obtaining a registration instruction from printers different from the printer 100, the CPU 22 stores the registration information RI2, RI3, etc. in the memory 24, as in the case of the printer 100.

In a case where an input operation for inputting the address information AI1 is performed on the printer 100 by the user after the serial number SN1 has been registered in the memory 24, the CPU 22 obtains the address information AI1 from the printer 100, and registers the address information AI1 in association with the serial number SN1 in the memory 24.

The CPU 22 obtains use information from the printer 100 at a predetermined cycle (e.g., every day). The use information includes the serial number SN1, the model name MN1, the current remaining amount R1 of the print material, and the number of times of exchange EN1. Each time the use information is obtained from the printer 100, the CPU 22 adds to the history information HI1, in association with each other, the date of obtaining the use information, and the remaining amount R1 included in the use information. Thus, the history information HI1 is stored which includes a plurality of remaining amounts at a plurality of dates. Moreover, each time the cartridge is exchanged in the printer 100, the CPU 22 erases the current history information HI1. Specifically, in a case where the number of times of exchange EN1 included in the obtained use information has not been registered in the exchange table ET1, the CPU 22 determines that the cartridge has been exchanged in the printer 100, and erases the history information HI1. Then, the CPU 22 stores the date of obtaining the use information, and the remaining amount included in the use information as new history information HI1. That is, the history information HI1 includes only information relating to the cartridge currently installed in the printer 100. Moreover, in a modification, the CPU 22 may not erase the history information HI1 even if the cartridge is exchanged in the printer 100. That is, the history information HI1 may include not only information relating to the cartridge currently installed in the printer 100, but also information relating to the cartridge installed in the printer 100 in the past.

The number of times of exchange and an order flag are associated with each other in the exchange table ET1. Each time the use information is obtained from the printer 100, the CPU 22 determines whether the number of times of exchange included in that use information has been registered in the exchange table ET1. In case of determining that the number of times of exchange has not been registered, the CPU 22 newly registers that number of times of exchange and an order flag "0" in association with each other in the exchange table ET1 and, in case of determining that the number of times of exchange has been registered, the CPU 22 does not newly register that number of times of exchange. The order flag "0" means that order information for dispatching a new cartridge to the user of the printer 100 has not yet been supplied to the service server 500 in a situation where a cartridge corresponding to the number of times of exchange associated with the order flag is installed in the printer 100. Further, an order flag "1" means that order information has already been supplied to the service server 500.

Further, the greatest slope value GV1 indicates a greatest slope value among a plurality of slope values calculated using the history information HI1. Each slope value indicates a change in a remaining amount per day calculated from two remaining amounts on two dates (e.g., 4/3 and 4/4). An initial value of the greatest slope value GV1 is 0%. The greatest slope value GV1 is changed to the initial value each time the cartridge is exchanged in the printer 100. That is, the greatest slope value GV1 is calculated only from the history of the remaining amount of the cartridge currently installed in the printer 100. Moreover, in a modification, the greatest slope value GV1 may not be initialized even if the cartridge is exchanged in the printer 100. In this case, the greatest slope value GV1 is calculated from both the history of the remaining amount of the cartridge currently installed in the printer 100, and the history of the remaining amount of the cartridge installed in the printer 100 in the past.

(Configuration of Service Server 500)

The service server 500 is a server providing a cartridge dispatching service. The service server 500 may be located on the internet 6 by a vendor of the management server 10, or may be located by an operator different from the vendor. Upon obtaining order information from the management server 10, the service server 500 dispatches a cartridge to, as the destination, an address indicated by the address information included in the order information.

Figure 2:
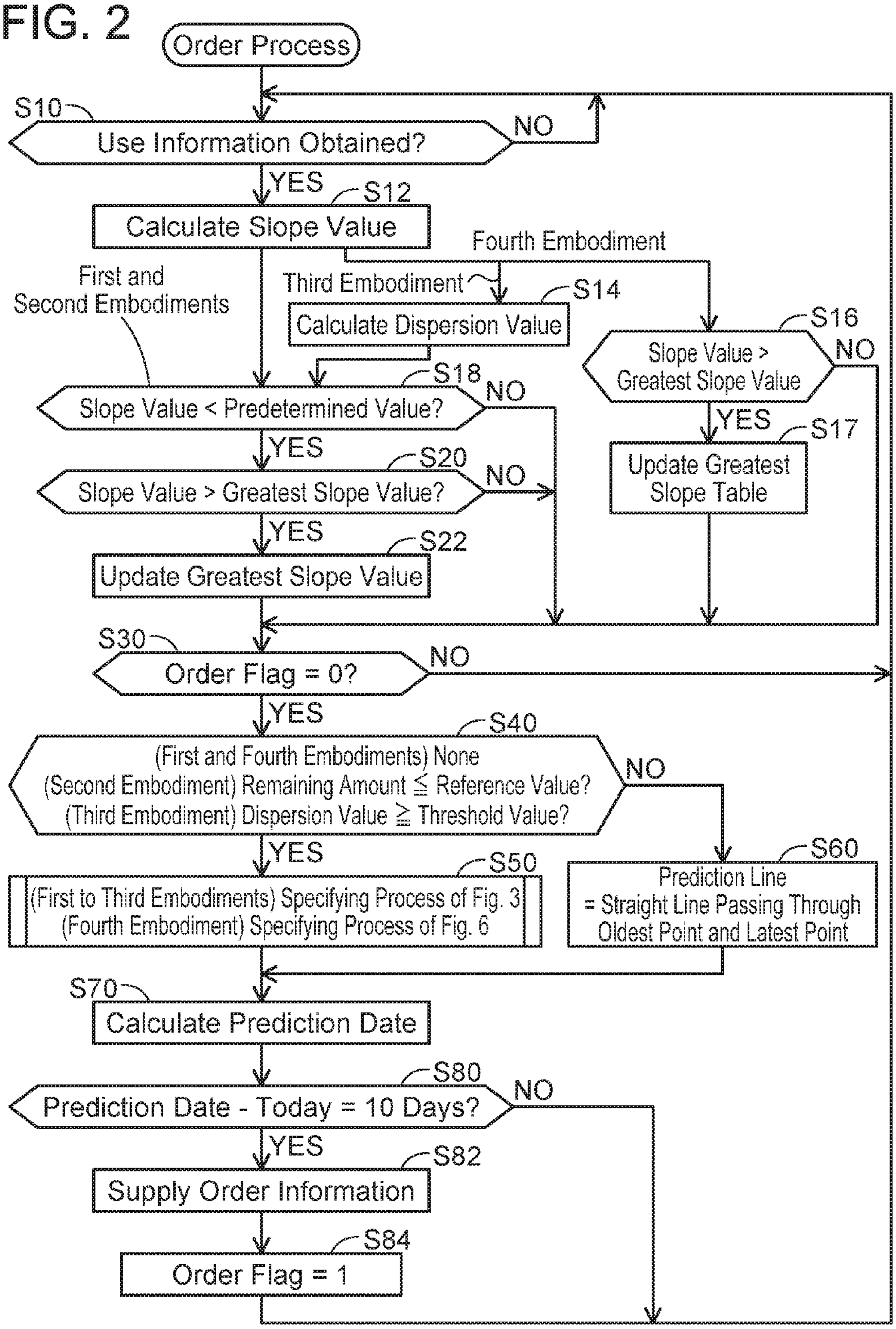
FIG. 2 shows a flowchart of an ordering process.

(Ordering Process: FIG. 2)

Contents of an ordering process executed by the CPU 22 of the management server 10 in accordance with the program 26 will be described with reference to FIG. 2. The ordering process is started with power of the management server 10 being turned ON as the trigger.

In S10, the CPU 22 monitors whether the use information has been obtained from a printer (e.g., the printer 100) via the network I/F 12. The use information is obtained from the printer every day. In case of obtaining the use information (YES in S10), the CPU 22 specifies the registration information (e.g., "RI1") associated with the serial number (e.g., "SN1") included in the use information, and proceeds to S12. Below, the description will be continued using, as an example, a case where the registration information RI1 corresponding to the printer 100 is specified.

In S12, the CPU 22 associates the remaining amount included in the use information obtained in S10 with today's date, adds these to the history information HI1 included in the registration information RI1, and calculates the slope value. Specifically, the CPU 22 first specifies, from the history information HI1, the remaining amount on the latest date (i.e., today's date), and the remaining amount on the previous date (i.e., the previous day's date). Then, the CPU 22 calculates a slope value indicating the change in the remaining amount for one day by calculating the difference in the specified remaining amounts.

In S18, the CPU 22 determines whether the calculated slope value is equal to or less than a predetermined value (e.g., 10%). The CPU 22 proceeds to S20 in case of determining that the calculated slope value is equal to or less than the predetermined value (YES in S18), and skips the processes of S20, S22, and proceeds to S30 in case of determining that the calculated slope value is greater than the predetermined value (NO in S18).

In S20, the CPU 22 determines whether the calculated slope value is greater than the greatest slope value GV1 being stored in the memory 24. The CPU 22 proceeds to S22 in case of determining that the calculated slope value is greater than the greatest slope value GV1 (YES in S20), and skips the process of S22 and proceeds to S30 in a case where the calculated slope value is equal to or less than the greatest slope value GV1 (NO in S20).

In S22, the CPU 22 updates the greatest slope value GV1 being stored in the memory 24 to the calculated slope value. In other words, the CPU 22 specifies, from the plurality of slope values calculated by using the history information HI1, the slope value having the greatest change in remaining amount for one day, and stores that slope value in the memory 24 as the greatest slope value GV1.

In particular, by the process of S18 being performed, the CPU 22 can prevent a slope value greater than the predetermined value being stored as the greatest slope value GV1. For example, a slope value greater than the predetermined value indicates a change of the remaining amount in a period when a special situation occurred, such as the user executing a large amount of printing. Since the process of S18 is performed, a prediction date can be calculated without being affected by this type of special situation, and the accuracy of the prediction date can be improved. Moreover, in a modification, the process of S18 may not be performed.

In S30, the CPU 22 specifies, from the exchange table ET1 included in the registration information RI1, the order flag associated with the number of times of exchange included in the use information obtained in S10, and determines whether the order flag indicates "0". The CPU 22 proceeds to S50 in a case where the order flag indicates "0" (YES in S30), i.e., in a case where a cartridge has not yet been dispatched, and skips the subsequent processes, and returns to S10 in a case where the order flag indicates "1" (NO in S30), i.e., in a case where a cartridge has been dispatched. Moreover, in the first embodiment, the processes of S40, S60 are not performed.

Figure 3:
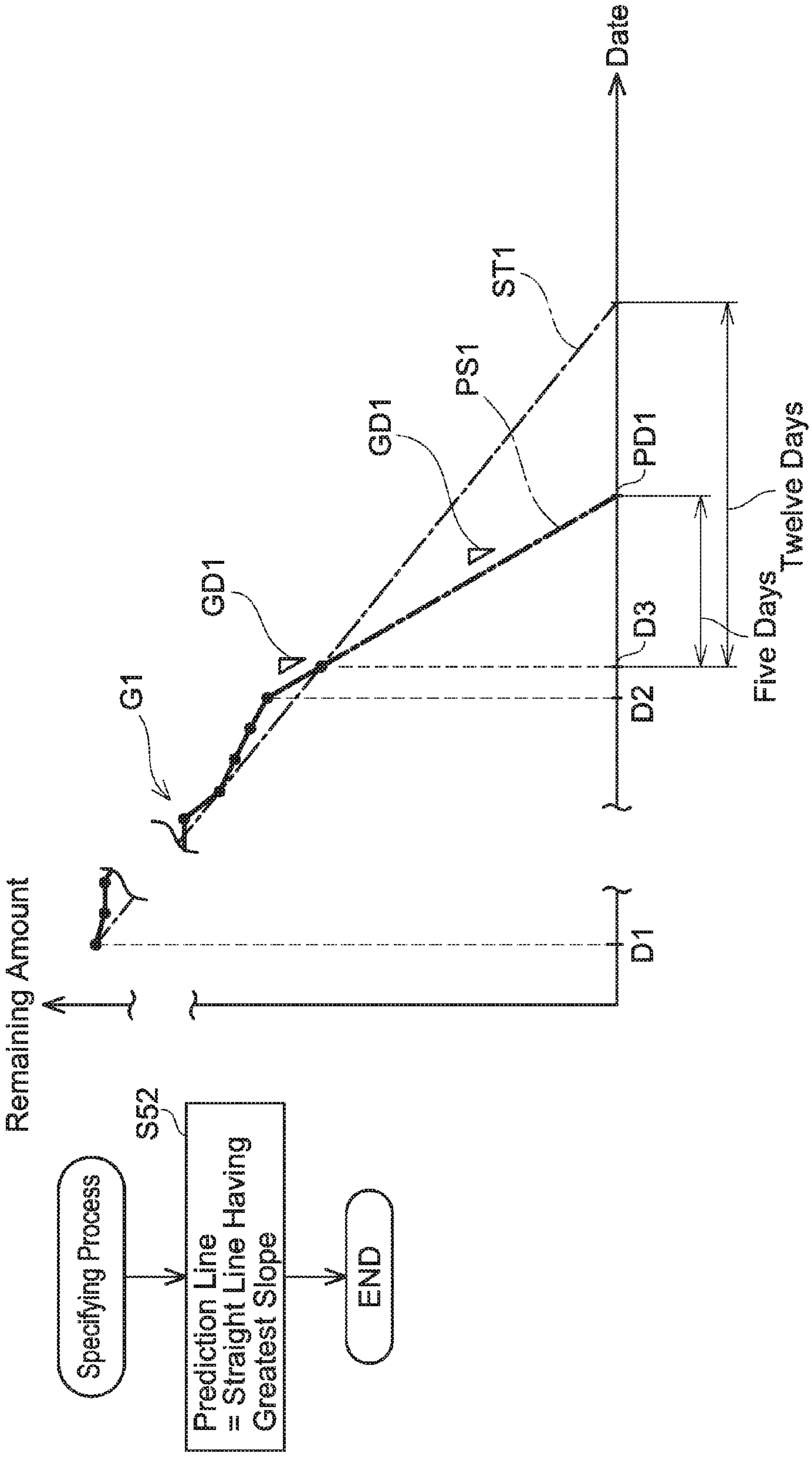
FIG. 3 shows a flowchart of a specifying process of first to third embodiments, and a graph representing a specific case of the first embodiment.

In S50, the CPU 22 executes a specifying process shown in FIG. 3. In S52 of FIG. 3, the CPU 22 calculates, as a prediction line, a straight line passing through a point represented by the remaining amount of the latest date (i.e., today's date) among the plurality of dates included in the history information HI1, and having a slope represented by the greatest slope value GV1.

In S70 of FIG. 2, the CPU 22 calculates, as the prediction date, a date indicated by a point corresponding to remaining amount 0% on the prediction line calculated in S52, the prediction date being a day on which the remaining amount of print material in the cartridge is predicted to reach 0%. That is, the prediction date is the day on which it is predicted that the printer 100 becomes incapable of performing a print using the print material in the cartridge.

In S80, the CPU 22 determines whether a period from today until the prediction date is within 10 days. Moreover, in a modification, a period different from 10 days may be used. The CPU 22 proceeds to S82 in case of determining that the period from today until the prediction date is within 10 days (YES in S80), and skips the subsequent processes and returns to S10 in case of determining that the period from today until the prediction date is greater than 10 days (NO in S80).

In S82, the CPU 22 supplies, to the service server 500, order information including the address information All included in the registration information RI1, and cartridge information. The cartridge information is information (e.g., model number of the cartridge) indicating the type of cartridge compatible with the printer 100 of the model indicated by the model name included in the use information obtained in S10. Thereby, the service server 500 dispatches a cartridge indicated by the cartridge information to, as the destination, the user address indicated by the address information AI.

In S84, the CPU 22 changers the order flag identified in S30 from "0" to "1". When the process of S84 ends, the process returns to S10.

(Specific Case in First Embodiment; FIG. 3)

Figure 4:
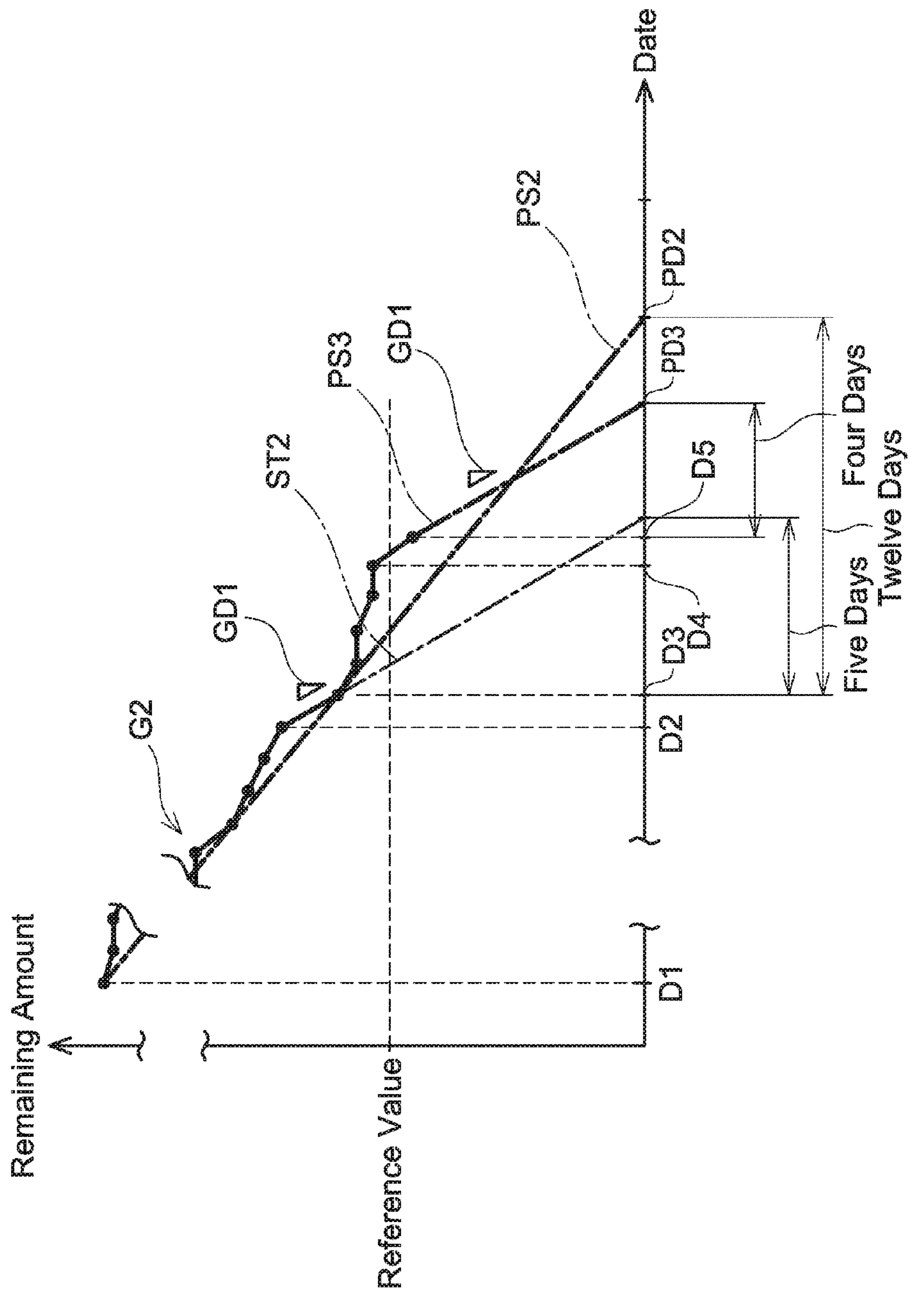
FIG. 4 shows a graph representing a specific case of the second embodiment.
Figure 5:
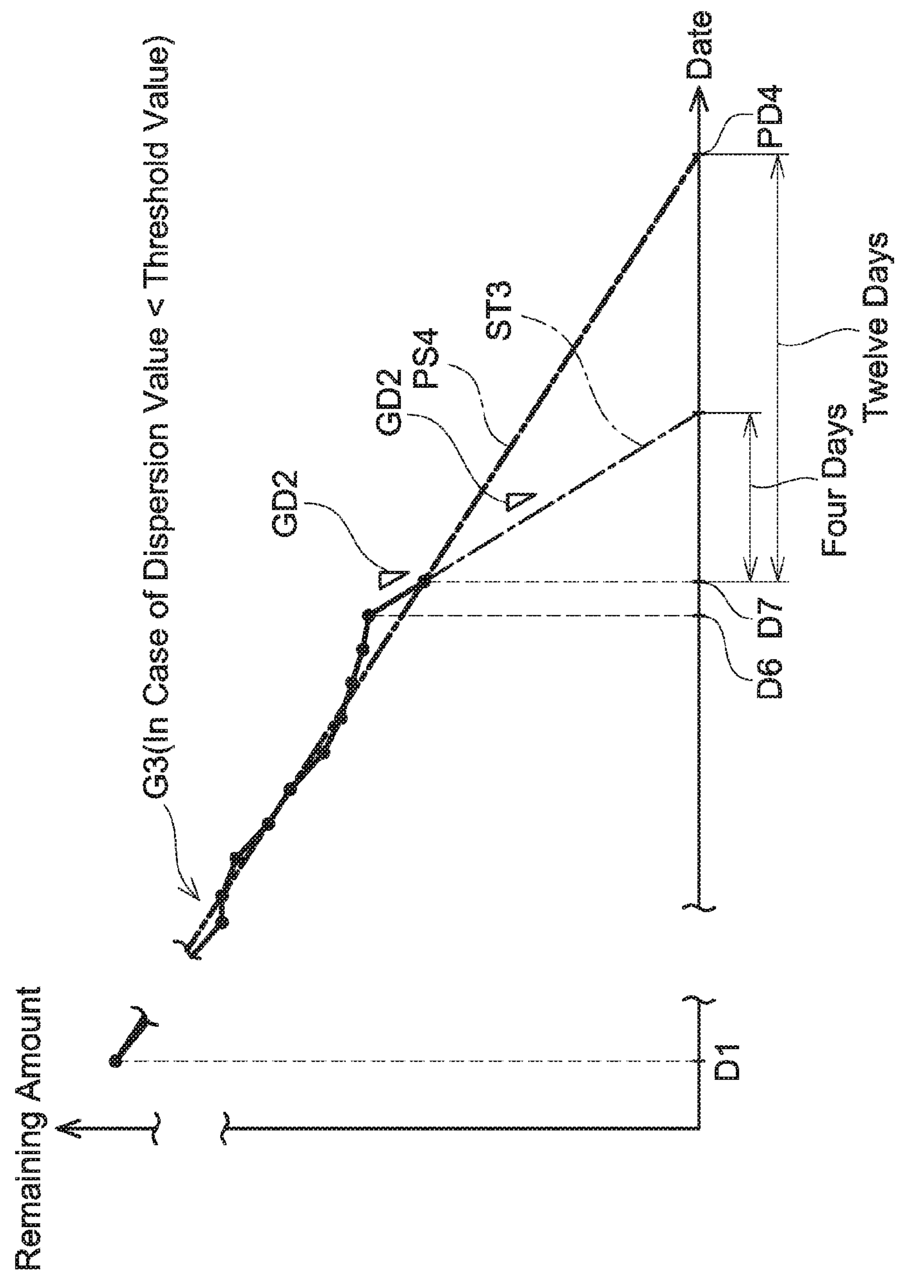
FIG. 5 shows a graph representing a specific case of the third embodiment.
Figure 6:
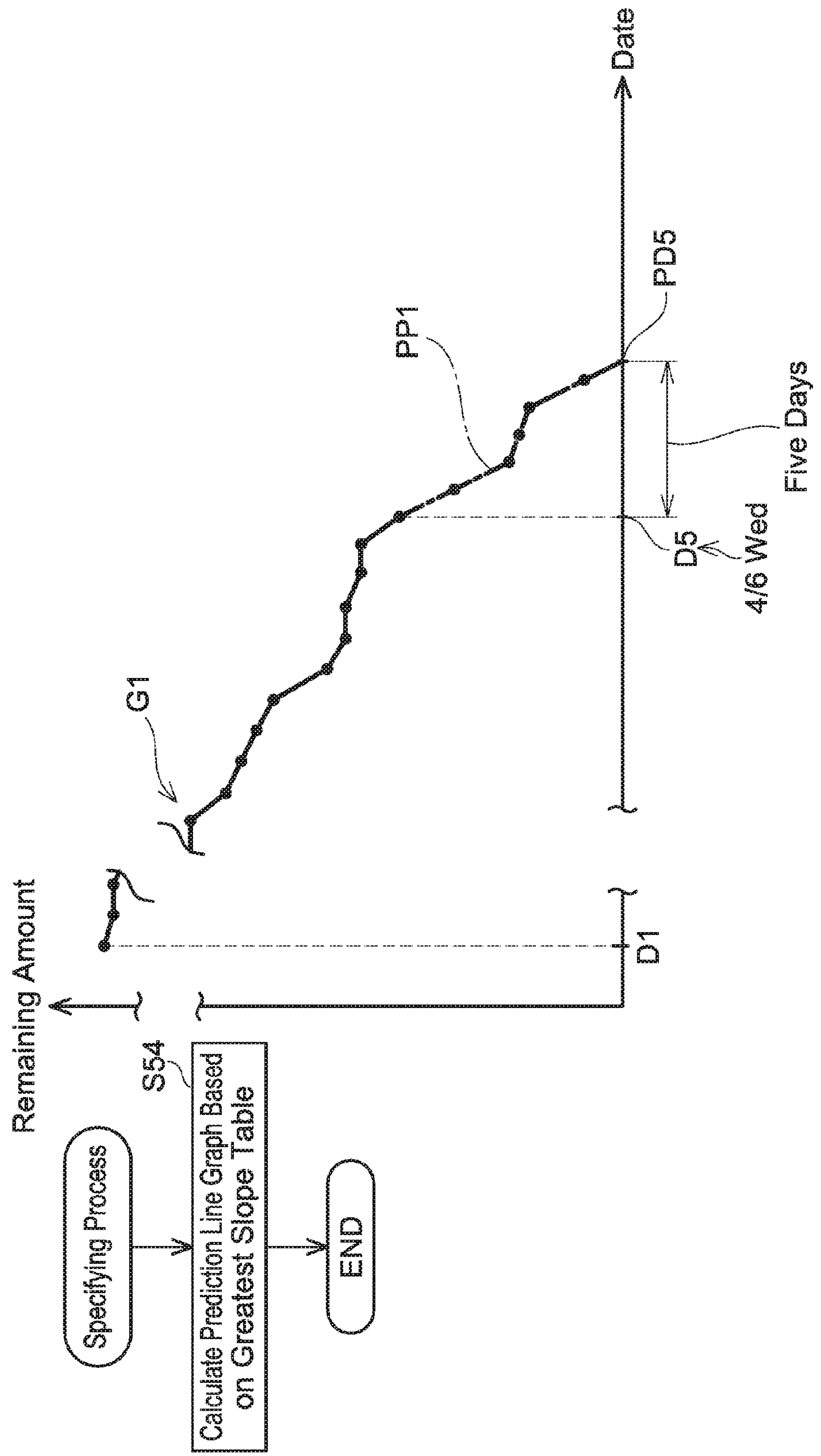
FIG. 6 shows a flowchart of a specifying process of a fourth embodiment, and a graph representing a specific case of the fourth embodiment.

A graph G1 shown in FIG. 3 is a graph in which the horizontal axis represents date and the vertical axis represents remaining amount. Each point in the graph shows the remaining amount for each date included in the history information HI1. The subsequent graphs of FIGS. 4 to 6 are similar. In graph G1, the greatest slope value GV1 shows a value GD1 calculated using the remaining amount on the latest date D3, and the remaining amount on date D2 which is one day prior. That is, this means that the usage amount of print material for one day from date D2 to date D3 is greater than the usage amount of print material in another period.

In the present case, upon obtaining the use information on date D3, the CPU 22 calculates a prediction line PS1 which passes through a point showing the remaining amount on the latest date D3, and has a slope indicated by the value GD1 which is the greatest slope value GV1 (S52). The CPU 22 calculates, as the prediction date PD1, the date indicated by the point corresponding to remaining amount 0% on the prediction line PS1 (S70). Then, since the period from the latest date D3 to the prediction date PD1 is five days (YES in S80), the CPU 22 supplies the order information to the service server 500 (S82).

For example, a comparative example is envisioned which uses a straight line ST1 shown in FIG. 3 instead of the prediction line PS1 to calculate the prediction date. The straight line ST1 is a straight line passing through a point indicating an oldest remaining amount at an oldest date D1 included in the history information HI1, and a point indicating a latest remaining amount at the latest date D3. The slope of this straight line indicates an average value of change in the remaining amount for one day in the period from the oldest date to the latest date. In this case, since the period from the latest date D3 to the prediction date is 12 days (NO in S80), the cartridge is not dispatched. For example, each day after the latest date D3, printing might be executed with an amount of change indicated by the slope value GD1. If this type of situation occurs, the remaining amount of print material reaches 0% in a period shorter than 12 days. In this case, in the configuration of the comparative example, there is a risk that the user does not receive a new cartridge even if the remaining amount of print material in the cartridge reaches 0%.

In contrast, in the present embodiment, since the prediction line PS1 has a slope indicated by the greatest slope value GV1, the prediction date PD1 is a value which considers the possibility of the aforementioned situation occurring in the future. Since the period from the latest date D3 to the prediction date PD1 is five days (YES in S80), the cartridge is dispatched. Consequently, even if the aforementioned situation occurs in the future, the user can receive a new cartridge before the remaining amount of print material in the cartridge reaches 0%. Thus, the management server 10 appropriately calculates the prediction date, and can provide the user with a new cartridge before the remaining amount of print material in the cartridge reaches 0%.

(Correspondence Relationship)

The management server 10 is an example of "control device". The internet 6 is an example of "network". The remaining amount included in the use information of S10, the slope value calculated in S12, and the greatest slope value GV1 are an example of "current value", "change value" and "first greatest change value", respectively. The prediction date PD1 is an example of "first future value". The process of S82 is an example of "output process". The plurality of slope values calculated in S12, and the two or more slope values for which YES is determined in S18 are examples of "M change values" and "N1 change values", respectively. The processes of S50 and S70 are an example of "first prediction process".

(Second Embodiment)

In the present embodiment, excepting the point that processes of S40, S60 of FIG. 2 are executed, processes the same as in the first embodiment are executed.

In S40, the CPU 22 determines whether the remaining amount included in the use information obtained in S10 is equal to or less than a reference value (e.g., 20%). The CPU 22 proceeds to S50 in case of determining that the remaining amount is equal to or less than the reference value (YES in S40), and proceeds to S60 without executing the process of S50 in case of determining that the remaining amount is greater than the reference value (NO in S40).

In S60, the CPU 22 calculates, as a prediction line, a straight line which passes through a point showing the oldest remaining amount at the oldest date among the plurality of dates included in the history information HI1, and a point showing the latest remaining amount at the latest date The slope of this prediction line indicates an average value of change in the remaining amount of print material for one day in the period from the oldest date to the latest date.

(Specific Case in Second Embodiment; FIG. 4)

As shown in FIG. 4, in a graph G2, the greatest slope value GV1 shows the value GD1, which is calculated using the remaining amount on date D3, and the remaining amount on date D2 which is one day prior.

In the present case, the use information obtained before date D4 includes a remaining amount greater than the reference value. Consequently, at dates before date D4 the CPU 22 determines NO in S40, and calculates the prediction line by the process of S60. For example, on date D3, the CPU 22 calculates a prediction line PS2 which passes through a point indicating the remaining amount on date D3, and a point indicating the remaining amount on the oldest date D1 (S60). The CPU 22 calculates the date indicated by the point corresponding to remaining amount 0% on the prediction line PS2 as a prediction date PD2 (S70). Since the period from the date D3 to the prediction date PD2 is 12 days (NO in S80), the CPU 22 does not supply the order information. Consequently, the cartridge is not dispatched.

On the other hand, a remaining amount equal to or less than the reference value is included in the use information obtained after date D4. Therefore, the CPU 22 determines YES in S40, e.g., on date D5 which is after date D4, and calculates a prediction line PS3 by means of the process of S50. The prediction line PS3 has a slope indicated by the greatest slope value GV1 (i.e., slope value GD1). Since the period from date D5 to the prediction date PD3, this being calculated using the prediction line PS3, is four days (YES in S80), the CPU 22 supplies the order information to the service server 500 (S82).

At date D3, the remaining amount is greater than the reference value, and a relatively large amount of print material remains in the cartridge. In this type of situation, if the CPU 22 executes the process of S50 without executing the processes of S40, S60, and calculates the prediction date using a straight line ST2 having a slope indicated by the greatest slope value GV1, YES is determined in S80, and the cartridge is dispatched. In this case, the user receives a cartridge despite adequate print material remaining in the cartridge, and the user may feel displeased.

By contrast, in the present embodiment, at date D3 the prediction date is calculated using the prediction line PS2 which has a slope more gradual than the slope of the straight line ST1, and consequently NO is determined in S80, and a cartridge is not dispatched. Consequently, it is possible to prevent the user from receiving a cartridge in a situation of adequate print material remaining in the cartridge.

(Correspondence Relationship)

The remaining amount at date D3, and the remaining amount at date D1 are an example of "latest current value" and "oldest current value", respectively. The slope value indicating the slope of the prediction line PS2 is an example of "one change value". The prediction date PD2 and the prediction date PD3 are an example of "first future value" and "second future value", respectively. The processes of S60 and S70 are an example of "second prediction process".

(Third Embodiment)

In the present embodiment, processes the same as in the first embodiment are executed, excepting for the point that the process of S14 is executed subsequent to S12 of FIG. 2, and the point that the processes of S40, S60 are executed.

In S14, the CPU 22 uses the history information HI1 to calculate a dispersion value indicating the dispersion of change in the remaining amount of print material for one day. Specifically, the CPU 22 specifies, from the plurality of remaining amounts included in the history information HI1, all the combinations of two remaining amounts of two consecutive dates (e.g., 4/3 and 4/4), and calculates the slope value for each combination. Then, the CPU 22 calculates the standard deviation of the calculated plurality of slope values as the dispersion value.

Moreover, in a modification, the CPU 22 may calculate, as the slope value at each date, the change in the remaining amount of print material for one day, calculated from the remaining amount for each date, and the remaining amount of the previous day's date for each date. Then, in a case where, e.g. seven days are adopted as the predetermined period, the CPU 22 calculates, as a variation value indicating variation of the slope value in the seven days, an absolute value of the difference between the slope value of a day in the center of the seven day period (e.g., the fourth day in the seven day period), and an average value of the seven slope values of the seven day period. Then, the CPU 22 may adopt, as the dispersion value, the average value of the variation value of each predetermined period (e.g., each seven day period).

In S40, the CPU 22 determines whether the dispersion value calculated in S14 is equal to or greater than a threshold value. The CPU 22 proceeds to S50 in case of determining that the dispersion value is equal to or greater than the threshold value (YES in S40), and proceeds to S60 without executing the process of S50 in case of determining that the dispersion value is less than the threshold value (NO in S40). The process of S60 is the same as in the second embodiment.

(Specific Case in Third Embodiment; FIG. 5)

As shown in FIG. 5, in graph G3, the greatest slope value GV1 is a slope value GD2 calculated using the remaining amount of date D7, and the remaining amount of date D6 which is one day prior.

In the present case, the usage amount of the print material in the period from date D6 to date D7 is considerably greater than the period before date D6. Consequently, since the usage situation of the print material in the period before date D6 is stable, the dispersion value calculated using the history information HI1 corresponding to the graph G3 is less than the threshold value. Therefore, since the dispersion value calculated in S14 is less than the threshold value (NO in S40), the CPU 22 calculates a prediction line PS4 by means of the process of S60. The prediction line PS4 passes through a point indicating the remaining amount at the latest date D7, and a point indicating the remaining amount at the oldest date D1. Since the period from date D7 to the prediction date PD4 is 12 days (NO in S80), the CPU 22 does not supply the order information. Thus, the cartridge is not dispatched.

As described above, a large amount of print material is used in the period from date D6 to date D7. In these special situation, if the CPU 22 executes the process of S50 without executing the processes of S14, S40, S60, calculating the prediction date using a straight line ST3 having a slope indicated by the greatest slope value GV1 (i.e., slope value GD2), a cartridge is dispatched within the period of four days from date D7 to the prediction date. However, since it is unlikely for these special situation to occur in the future, the cartridge is dispatched too early, and may make the user feel displeased.

In contrast, in the present embodiment, the prediction date is calculated using the prediction line PS4 having a slope more gradual than the slope of the straight line ST2, and consequently NO is determined in S80, and the cartridge is not dispatched. Therefore, it is possible to prevent the cartridge from being dispatched too early.

(Correspondence Relationship)

The remaining amount of date D7, and the remaining amount of date D1 are an example of "latest current value" and "oldest current value", respectively. The slope value indicating the slope of the prediction line PS4 is an example of "one change value". The processes of S60 and S70 are an example of "second prediction process".

(Fourth Embodiment)

In a fourth embodiment, the memory 24 of the management server 10 stores a greatest slope table GT1 (see FIG. 1) instead of the greatest slope value GV1. The greatest slope table GT1 is a table for storing greatest slope values for each day of a week. For example, a slope value for Monday is calculated from the remaining amount obtained on Monday, and the remaining amount obtained on Sunday, the day before Monday. The greatest slope value among the plurality of slope values of the Mondays is the greatest slope value for Monday.

In the present embodiment, the same processes are executed as in the first embodiment, excepting the point that the processes of S16, S17 are executed instead of the processes from S18 to S22 of FIG. 2, and the point that S54 of FIG. 6 is executed as the specifying process of S50.

In S16, the CPU 22 specifies, from the greatest slope table GT1, the greatest slope value for the day with the latest date (i.e., today) in the history information HI1, and determines whether the slope value calculated in S12 is greater than the specified greatest slope value. The CPU 22 proceeds to S17 in case of determining that the calculated slope value is greater than the specified greatest slope value (YES in S16), and the CPU 22 skips S17, and proceeds to S30 in case of determining that the calculated slope value is equal to or less than the specified greatest slope value (NO in S16).

In S17, the CPU 22 updates the greatest slope value for today's day, in the greatest slope table GT1, to the calculated slope value.

In S54 of FIG. 6, the CPU 22 uses the greatest slope table GT1 to calculate a prediction polygonal line graph passing through a point indicating the remaining amount of today. The prediction polygonal line graph has the greatest slope values for each day of the week.

In S70 of FIG. 2, the CPU 22 calculates, as the prediction date, the date indicated by a point corresponding to remaining amount 0% on the prediction polygonal line graph calculated in S54.

(Specific Case in Fourth Embodiment; FIG. 6)

As shown in FIG. 6, upon obtaining the use information on date D5, which is Wednesday, the CPU 22 calculates a prediction polygonal line graph PP1 passing through date D5 (S54). Specifically, the CPU 22 first specifies the greatest slope value for Thursday from the greatest slope table GT1, and plots a point indicating the remaining amount, in which the specified greatest slope value has been subtracted from the remaining amount included in the use information. Next, the CPU 22 specifies the greatest slope value for Friday from the greatest slope table GT1, and plots a point indicating the remaining amount, in which the specified greatest slope value has been subtracted from the remaining amount plotted immediately before. By repeating this, the CPU 22 calculates the prediction polygonal line graph PP1, and then calculates, as the prediction date PDS, the date indicated by the point corresponding to remaining amount 0% on the graph PP1 (S70). Since the period from the latest date D5 to the prediction date PDS is five days (YES in S80), the CPU 22 supplies the order information to the service server 500 (S82).

In the present embodiment also, as in the first embodiment, the management server 10 can appropriately calculate the prediction date. In particular, since the management server 10 calculates the prediction date using the greatest slope value for each day, the prediction date can be calculated accurately.

(Correspondence Relationship)

A period from, for example, Sunday until the next day Monday, a period from, for example, Monday until the next day Tuesday, a greatest slope value for Monday in the greatest slope table GT1, and a greatest slope value for Tuesday in the greatest slope table GT1 are an example of “first predetermined period”, “second predetermined period”, “first greatest change value” and “second greatest change value”, respectively.

(Modification 1)

The management server 10 may not be provided. In this case, a controller of the printer 100 may execute the ordering process of FIG. 2. In this case, the controller of the printer 100, and a print engine of the printer 100 are examples of “control device” and “print performing unit” respectively.

(Modification 2)

The printer 100 may store, instead of the current remaining amount R1, the usage amount of the print material in a cartridge of a period from the cartridge being attached until the present. In this case, the management server 10 may obtain the use information including the stored usage amount from the printer 100, and execute the ordering process of FIG. 2 using the usage amount. In the present modification, the usage amount included in the use information is an example of “current value”.

(Modification 3)

The CPU 22 may not execute the processes S12 to S22 of FIG. 2. In this case, after S30 and before S50, the CPU 22 may use the plurality of remaining amounts included in the history information HI1 to calculate the plurality of slope values, and specify the largest greatest slope value from among the plurality of slope values.

(Modification 4)

The memory 24 may store, instead of the history information HI1, only one remaining amount of the latest date. In this case, when obtaining new use information, in S12 the CPU 22 may use the remaining amount in the memory 24 (i.e., the remaining amount included in the use information obtained the previous time), and the remaining amount included in the obtained use information, to calculate a slope value indicating the change in remaining amount for one day. After having calculated the slope value, the CPU 22 may update the remaining amount in the memory 24 to the remaining amount included in the obtained use information. In the present modification, it is possible to reduce the amount of information to be stored in the memory 24.

(Modification 5)

The CPU 22 may not execute the processes subsequent to S70 of FIG. 2. In this case, the CPU 22 specifies the remaining amount on a prediction line at a date when a predetermined number of days (e.g., three days) has elapsed since the latest date, and may provide information indicating the specified remaining amount to the printer 100 in order to display the specified remaining amount on a display unit of an external device (e.g., the printer 100). In the present modification, the specified remaining amount, and the supply of information indicating the remaining amount are an example of “first future value” and “output process”, respectively.

(Modification 6)

The CPU 22 may not execute the processes of S80, S82 of FIG. 2. In this case, in order to display the prediction date on an external device (e.g., the display unit of the printer 100), the CPU 22 may supply information indicating the prediction date to the printer 100. In the present modification, the supply of information indicating the prediction date is an example of “output process”.

(Modification 7)

The greatest slope table GT1, instead of storing the greatest slope value for each day, may store a greatest slope value for an ordinary day, and a greatest slope value for a holiday. Other processes are the same as in the fourth embodiment. In the present modification, an ordinary day period, a holiday period, the greatest slope value of the ordinary day, and the greatest slope value of the holiday are an example of “first predetermined period”, “second predetermined period”, “first greatest change value” and “second greatest change value”, respectively.

(Modification 8)

The CPU 22 may combine the determination of S40 of the second embodiment and the determination of S40 of the third embodiment, and determine whether to execute either of the process of S50 or the process of S60. In one example, the CPU 22 may execute the process of S50 in a case where the remaining amount is equal to or less than the reference value, and the dispersion value is equal to or greater than the threshold value, and may execute the process of S60 in other cases. Further, in another example, the process of S50 may be executed in a case where the remaining amount is equal to or less than the reference value, or the remaining amount is greater than the reference value, and the dispersion value is equal to or greater than the threshold value, and may execute the process of S60 in other cases.

(Modification 9)

In S60, the CPU 22 may calculate an approximate straight line by using the plurality of remaining amounts of the plurality of sets of date-and-time included in the history information HI1, and may specify the approximate straight line as the prediction line. The method for calculating the approximate straight line is, e.g., the least-square method.

(Modification 10)

Figure 7:
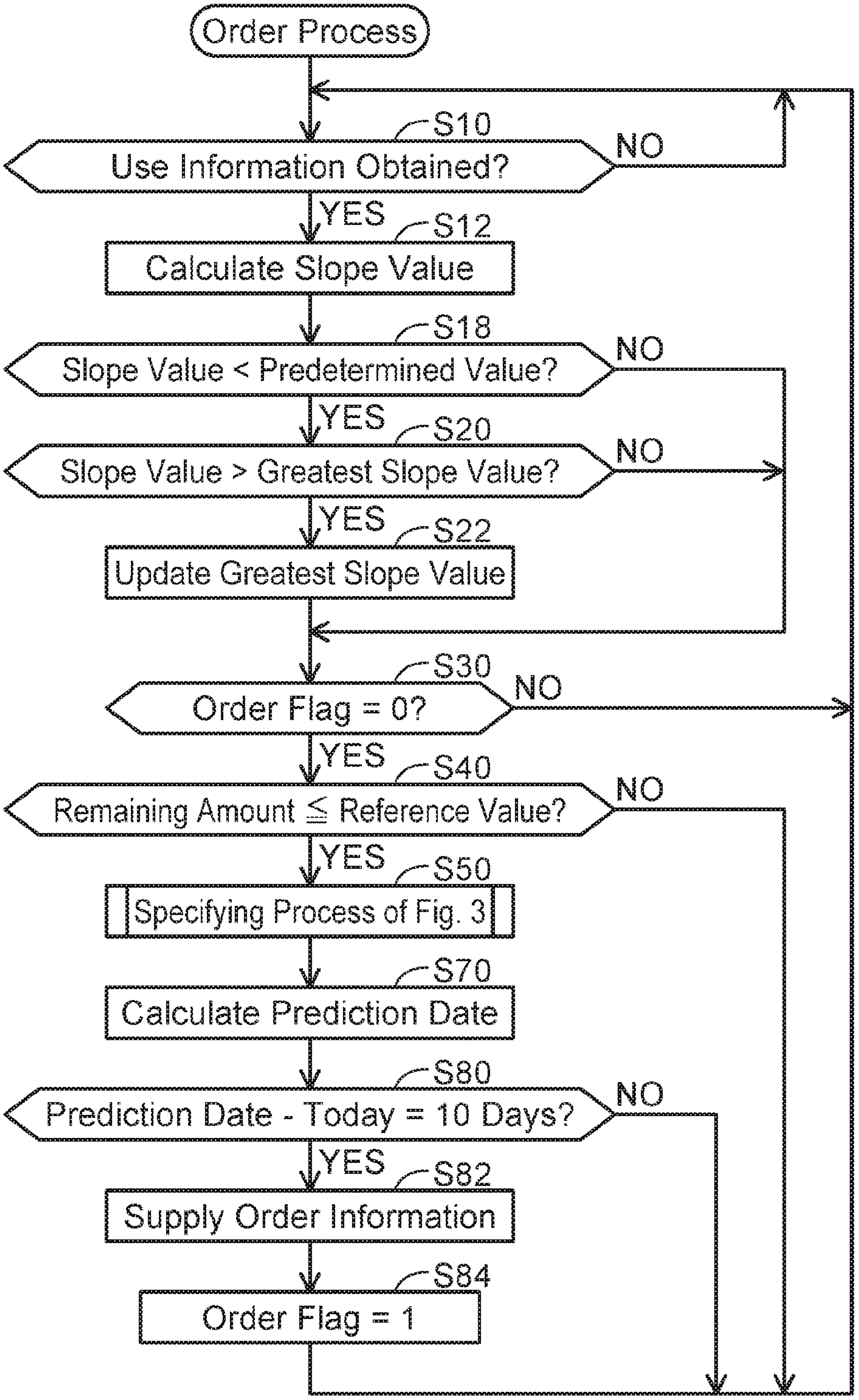
FIG. 7 shows a flowchart of an ordering process in a modification.

The CPU 22 may not execute the process of S60. FIG. 7 shows an ordering process in the present modification. The ordering process of FIG. 7 is similar to that in the second embodiment except for the point that the process of S60 is omitted. The CPU 22 executes process of S50 and subsequent processes in case of determining that the remaining amount included in the use information obtained in S10 is equal to or less than the reference value (YES in S40). On the other hand, the CPU 22 skips process of S50 and subsequent processes and returns to S10 in case of determining that the remaining amount is more than the reference value (NO in S40). The remaining amount more than the reference value indicates that the print material remains in the cartridge adequately. In the present modification, similarly to the second embodiment, it is possible to prevent the user from receiving a cartridge in a situation of adequate print material remaining in the cartridge.

The invention claimed is:

1. A non-transitory computer-readable recording medium storing computer-readable instructions for a control device configured to perform a process related to a print performing unit, the computer-readable instructions, when executed by a processor of the control device, causing the control device to execute:

obtaining a current value related to a current remaining amount of a print material used by the print performing unit at a plurality of dates-and-time, each current value being for a different date;

calculating N1 (N1 being an integer equal to or greater than 2) change values by using a plurality of current values obtained at the plurality of dates-and-time, each change value being related to a change per unit time in a remaining amount of the print material;

specifying a first greatest change value indicating that the change per unit time for a first date to a second date is the greatest among the N1 change values;

a first prediction process that includes calculating a first future value by using the first greatest change value, the first future value being related to a future remaining amount of the print material; and a first output process for outputting order information to an external device at least based on the first future value in a case where the first prediction process is performed.

2. The non-transitory computer-readable recording medium as in claim 1, wherein the first future value is a value related to a predicted date that the print performing unit becomes incapable of performing a print by using the print material.

3. The non-transitory computer-readable recording medium as in claim 1, wherein the calculating of the N1 change values includes:

calculating M (M being an integer greater than N1) change values including the N1 change values by using the plurality of current values; and specifying the N1 change values by excluding one or more change values from the M change values, each of the one or more change values indicating that the change per unit time is greater than a predetermined value.

4. The non-transitory computer-readable recording medium as in claim 1, wherein the first prediction process is executed in a case where a latest current value obtained at the latest date-and-time among the plurality of current values indicates that a remaining amount of the print material is equal to or less than a reference value.

5. The non-transitory computer-readable recording medium as in claim 4, wherein the computer-readable instructions, when executed by the processor, cause the control device to further execute:

a second prediction process in a case where the latest current value indicates that a remaining amount of the print material is more than the reference value, the second prediction process including:

calculating one change value by using the latest current value and an oldest current value obtained at the oldest date-and-time among the plurality of current values; and calculating a second future value by using the calculated one change value, the second future value being related to a future remaining amount of the print material; and a second output process for outputting information at least based on the second future value in a case where the second prediction process is performed.

6. The non-transitory computer-readable recording medium as in claim 1, wherein the computer-readable instructions, when executed by the processor, cause the control device to further execute:

calculating a dispersion value by using the plurality of current values, the dispersion value being related to a dispersion of a change per unit time in a remaining amount of the print material, wherein the first prediction process is executed in a case where the dispersion value indicates that the dispersion is equal to or greater than a threshold value, and the first prediction process is not executed in a case where the dispersion value indicates that the dispersion is less than the threshold value.

7. The non-transitory computer-readable recording medium as in claim 6, wherein the computer-readable instructions, when executed by the processor, cause the control device to further execute:

a second prediction process in the case where the dispersion value indicates that the dispersion is less than the threshold value, the second prediction process including:

calculating one change value by using a latest current value obtained at the latest date-and-time among the plurality of current values and an oldest current value obtained at the oldest date-and-time among the plurality of current values; and calculating a second future value by using the calculated one change value, the second future value being related to a future remaining amount of the print material; and a second output process for outputting information at least based on the second future value in a case where the second prediction process is performed.

8. The non-transitory computer-readable recording medium as in claim 1, wherein the N1 change values correspond to a first predetermined period, the computer-readable instructions, when executed by the processor, cause the control device to further execute:

calculating N2 (N2 being an integer equal to or greater than 2) change values correspond to a second predetermined period different from the first predetermined period by using the plurality of current values; and specifying a second greatest change value indicating that the change per unit time is the greatest among the N2 change values, wherein in the first prediction process, the first future value is calculated by using the first greatest change value and the second greatest change value.

9. The non-transitory computer-readable recording medium as in claim 1, wherein the first output process includes a process of outputting order information for ordering the print material.

10. The non-transitory computer-readable recording medium as in claim 1, wherein the current value is obtained from the print performing unit via a network.

11. A control device comprising:

a processor; and a memory configured to store computer-readable instructions therein, the computer-readable instructions, when executed by the processor, causing the control device to perform:

obtaining a current value related to a current remaining amount of a print material used by the print performing unit at a plurality of dates-and-time, each current value being for a different date;

calculating N1 (N1 being an integer equal to or greater than 2) change values by using a plurality of current values obtained at the plurality of dates-and-time, each change value being related to a change per unit time in a remaining amount of the print material;

specifying a first greatest change value indicating that the change per unit time for a first date to a second date is the greatest among the N1 change values;

a first prediction process that includes calculating a first future value by using the first greatest change value, the first future value being related to a future remaining amount of the print material; and a first output process for outputting order information to an external device at least based on the first future value in a case where the first prediction process is performed.

12. A non-transitory computer-readable recording medium storing computer-readable instructions for a control device configured to perform a process related to a print performing unit, the computer-readable instructions, when executed by a processor of the control device, causing the control device to execute:

obtaining a current value related to a current remaining amount of a print material used by the print performing unit at a plurality of dates-and-time, each current value being for a different date;

a first prediction process that includes calculating a first future value by using a plurality of current values obtained at the plurality of dates-and-time, in a case where a latest current value obtained at the latest date-and-time among the plurality of current values indicates that a remaining amount of the print material is equal to or less than a reference value, the first future value being related to a future remaining amount of the print material;

a first output process for outputting order information to an external device at least based on the first future value in a case where the latest current value indicates that the remaining amount of the print material is equal to or less than the reference value and the first prediction process is executed, wherein the first output process is not executed in a case where the latest current value indicates that the remaining amount of the print material is more than the reference value;

calculating N1 (N1 being an integer equal to or greater than 2) change values by using the plurality of current values, each change value being related to a change per unit time in the remaining amount of the print material; and specifying a first greatest change value indicating that the change per unit time for a first date to a second date is the greatest among the N1 change values, and wherein in the first prediction process, the first future value is calculated by using the first greatest change value.

13. The non-transitory computer-readable recording medium as in claim 12, wherein the first prediction process is not executed in a case where the latest current value indicates that the remaining amount of the print agent is more than the reference value.

* * * * *